United States Patent
Hurvitz et al.

(10) Patent No.: US 8,996,371 B2
(45) Date of Patent: Mar. 31, 2015

(54) METHOD AND SYSTEM FOR AUTOMATIC DOMAIN ADAPTATION IN SPEECH RECOGNITION APPLICATIONS

(75) Inventors: Eyal Hurvitz, Ramat Gan (IL); Ezra Daya, Petah Tikvah (IL); Oren Pereg, Amikam (IL); Moshe Wasserblat, Maccabim (IL)

(73) Assignee: Nice-Systems Ltd., Ra'anana (IL)

( * ) Notice: Subject to any disclaimer, the term of this patent is extended or adjusted under 35 U.S.C. 154(b) by 443 days.

(21) Appl. No.: 13/433,417

(22) Filed: Mar. 29, 2012

(65) Prior Publication Data

US 2013/0262106 A1 Oct. 3, 2013

(51) Int. Cl.
*G10L 15/26* (2006.01)
*G10L 15/183* (2013.01)

(52) U.S. Cl.
CPC .................... *G10L 15/183* (2013.01)
USPC ........... 704/235; 704/231; 704/251; 704/243; 704/244; 704/9; 704/10

(58) Field of Classification Search
CPC ....... G10L 15/00; G10L 15/06; G10L 15/063; G10L 15/065; G10L 15/20
USPC ................ 704/235, 231, 251, 244, 243, 9, 10
See application file for complete search history.

(56) References Cited

U.S. PATENT DOCUMENTS

| | | | | |
|---|---|---|---|---|
| 5,852,801 A | * | 12/1998 | Hon et al. | 704/244 |
| 6,334,102 B1 | * | 12/2001 | Lewis et al. | 704/255 |
| 6,345,249 B1 | * | 2/2002 | Ortega et al. | 704/244 |
| 2009/0292541 A1 | | 11/2009 | Daya et al. | |
| 2012/0029904 A1 | * | 2/2012 | Precoda et al. | 704/2 |
| 2012/0109651 A1 | * | 5/2012 | Chen | 704/240 |
| 2012/0209605 A1 | | 8/2012 | Hurvitz et al. | |

* cited by examiner

*Primary Examiner* — Qi Han
(74) *Attorney, Agent, or Firm* — Pearl Cohen Zedek Latzer Baratz LLP

(57) ABSTRACT

A system and method for adapting a language model to a specific environment by receiving interactions captured the specific environment, generating a collection of documents from documents retrieved from external resources, detecting in the collection of documents terms related to the environment that are not included in an initial language model and adapting the initial language model to include the terms detected.

18 Claims, 5 Drawing Sheets

METHOD AND SYSTEM FOR AUTOMATIC DOMAIN ADAPTATION IN SPEECH RECOGNITION APPLICATIONS

FIELD OF THE INVENTION

The present invention relates to the field of speech recognition.

BACKGROUND OF THE INVENTION

Speech recognition applications are commonly used in a variety of fields and systems which require conversion of voice or audio into text. While each industry, business and even each organization may use a unique professional vocabulary or jargon, characterized by special words, linguistic features, terms, idioms, and the like, applying a generic speech recognition model may result in low performance. One conspicuous problem that arises in speech recognition models is known as out-of-vocabulary words (OOV). Words such as innovative names of products, companies, trademarks, or words that are rare in generic contexts but are widely used in a specific domain may be absent from the training data of the generic model, and are hence not recognized. Furthermore, such words might be particularly central to a certain domain, hence failing to capture them significantly decreases model performance from the point of view of particular users. A process of adapting or "training" the generic model to a specific unique jargon is usually a long process that may require manual transcription of masses of data. There is a need for an automatic adaptation of a generic speech recognition model to a specific unique, jargon and for addressing the OOV problem.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
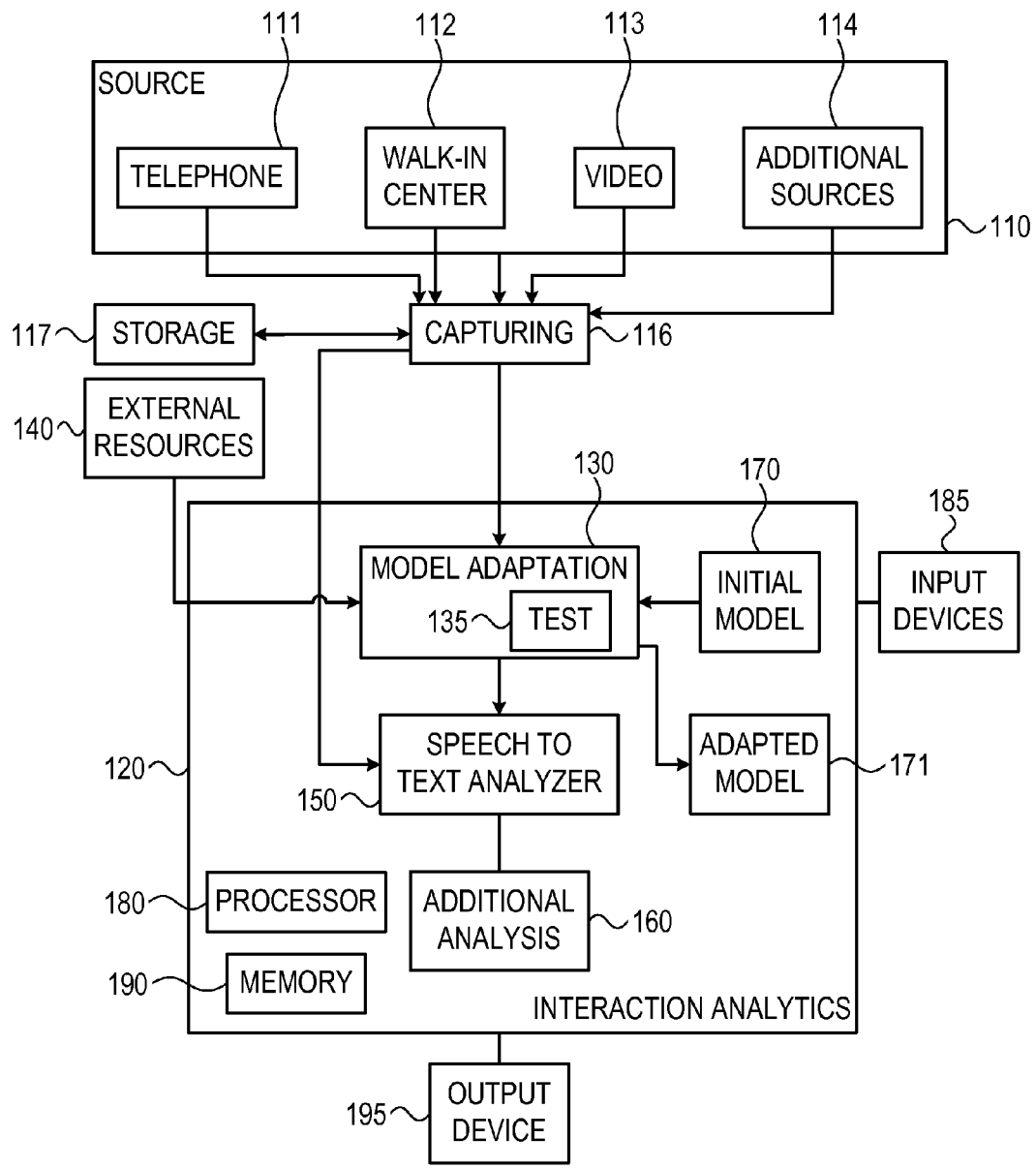
FIG. 1 is high-level block diagram of a language adaptation system according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the embodiments of present invention may be practiced without these specific details. In other instances, well-known methods, procedures and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification and claims to describe two or more components, devices, elements, units, parameters, or the like. For example, "a plurality of devices" may include two or more devices.

Although embodiments of the invention are not limited in this regard, the terms "contact center" and "call center" as used herein may be used throughout the specification and claims to describe any centralized or distributed locations used for collective handling of multi-media information, for example, telephone calls, faxes, e-mails and the like, or any other centralized or distributed locations used for the purpose of receiving, transmitting and controlling a large volume of interaction-related sessions.

Although embodiments of the invention are not limited in this regard, the terms "call", "session" or "interaction" as used herein may be used throughout the specification and claims to describe a communication session between two or more telecommunication components and thus, typically, between two or more human users using the components such as, a telephone call, an instant messaging session, chat (e.g., online or Internet based chat between two or occasionally more users of a display-based communications system, e.g. an Internet chat room or instant messaging system), video conference or any other multi-media session or interaction in a multi-media communication environment. Interactions, calls, and sessions typically involve exchanges of information using language which is text (e.g., e-mail messages, or text or chat messages) or which can be converted to text (e.g., an audio telephone conversation). Interactions can be one-way, e.g., a single one-way text message. The terms "call", "session", "communication session" or "interaction" may refer to any audio data, video data, screen capture data or any other media or multi-media session.

Although embodiments of the invention are not limited in this regard, the term "corpus" as used herein may be used throughout the specification and claims to describe a set or s group of words, texts, interactions and the like which may be used in linguistic methods such as, statistical analysis, linguistic research, hypothesis testing and the like.

Although embodiments of the invention are not limited in this regard, the term "domain" as used herein may be used throughout the specification and claims to describe any environment, situation, system, organization, business or location which may have a typical characteristics that have or be associated with a typical jargon or vocabulary which may be expressed in a variety of interactions and in any type of data, such as, audio data, video data, e-mail message, text message and the like. For example, the domain of a trading floor may be associated with a vocabulary such as short, long, stock, bond, hold, and put, where some of the vocabulary is infrequent in common usage and some of the vocabulary has words, having different meanings in the domain, than in general usage.

Some embodiments of the invention may be implemented, for example, using an article including or being a non-transitory machine-readable or computer-readable storage medium, having stored thereon instructions, that when executed on a computer, cause the computer to perform method and/or operations in accordance with embodiments of the invention. The computer-readable storage medium may store an instruction or a set of instructions that, when executed by a machine (for example, by a computer, a mobile device and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Video Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Embodiments of the present invention are directed to automatic adaptation or modification of a speech recognition model to typical characteristics of a certain domain. Across a plurality of documents, terms may be identified, found, or detected, which are associated with or related to an environment. The identified terms may be terms that are not included in the original language model. The language model may be augmented, adapted or modified; for example the identified terms detected may be added to the language model.

Reference is now made to FIG. 1, which is high-level block diagram of a language adaptation system according to embodiments of the present invention. System 100 may describe any interaction-rich environment such as a contact center. Other environments may be used. System 100 may be for example a contact center of a financial institute or a service center such as a bank, a trading floor, an insurance company and the like. System 100 may include one or more data sources 110, such as telephones 111, walk-in centers 112, video sources 113 and additional sources 114. Telephones 111 may generate voice interactions between two or more participants while walk-in centers 112 may generate interactions such as face to-face interactions. Video sources 113 may include, for example, audio components which may generate audio segments of, for example, video conferences. Additional sources 114 may include vocal sources such as microphones, intercom systems, vocal inputs from external systems, as well as broadcasts, files, streams, or any other input. Additional sources 114 may also include non vocal sources such as e-mails, chat sessions, screen events sessions, facsimiles which may be processed by, for example, Object Character Recognition (OCR) systems and the like. Any other source of data may be included in system 100. Sources 100 may produce input data, also referred to herein as "input segments" of various types from interactions between agents, customers, users, traders, customer representatives, organization members or other parties. As interactions may have a plurality of formats, or types, the input segments may be, for example, auditory segments, video segments, textual interactions or any other type of data.

As the main channel for communicating with users, colleagues, suppliers, customers and others in many organizations may be performed via telephone device from any kind, source 111 may include one or more telephone devices of various suitable types, for example, a landline telephone, a mobile telephone, a satellite telephone or any other telephone device. The voice may pass through a PABX or a voice over Internet protocol (IP) server, which in addition to the voice of two or more sides participating in the interaction may collect additional information related to the interaction such as interaction length, number and length of hold periods, transfer events during interaction, dialed number, Dialed Number Identification Service (DNIS), Automatic number identification (ANI), or the like. According to some embodiments of the invention, voice interactions may be captured, stored and processed hence the input segments is not limited to two-sided conversations.

Each of sources 100 may internally capture and store the interactions include an internal capturing platform and storing devices, units or modules It should be understood to a person skilled in the art that capturing of voice interactions, or the vocal part of other interactions, such as video, may employ many forms, formats, and technologies, for example, trunk side, extension side, summed audio, separate audio and the like, as well as various encoding and decoding protocols such as G729, G726, G723.1, and the like.

Capturing module 116 may receive or capture data generated by sources 100 and may log, save or record the data received from sources 100. Each of sources 110 may internally capture and store the interactions before transferring it to capturing module 116 and may include internal capturing platform, storing devices, units or modules. According to embodiments of the invention, capturing module 116 may be a recorder and may be coupled to a storage 117 in which the captured data may be stored. Storage 117 may be a storage device such as a mass storage device, for example an optical storage device such as a CD, a DVD, or a laser disk; a magnetic storage device such as a tape, a hard disk, Storage Area Network (SAN), a Network Attached Storage (NAS); a semi-conductor storage device such as Flash device, memory stick, and the like. Storage 117 may be common for different types of data, e.g., for data received from different sources or separate for each type of captured data. Storage 117 may be located onsite where the segments or some of them are captured, or in a remote location. The capturing or the storage components can serve one or more sites of a multi-site organization. In some embodiments of the present invention, storage 117 may be located externally or internally to capturing module 116 and/or to an interaction analytics 120. Storage 117 may include a memory unit (not shown) which may be any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Video Disks (DVDs), a tape, a cassette, or the like.

System 100 may include an interaction analytics module 120 which may adapt or modify an initial model such as to fit the domain of system 100 and may analyze the interactions received from the plurality of sources 110 based on the adapted model as described with reference to embodiments of the invention. Interaction analytics module 120 may identify, in a plurality of documents, terms associated with the environment or the domain of system 100 and if the identified terms are not included in a language model, interaction analytics module 120 may augment the language model to the identified terms detected.

Although embodiments are not limited in this respect a language model may include a language lexicon and a language stream with the probabilities of words and sequences of contiguous words, for example, a contiguous sequence of n items from a given sequence of text or speech, also known as "n-gram". According to embodiments of the invention, expansion or augmentation of a language model may include for example adding additional words to the existing lexicon and updating the n-gram probabilities.

Interaction analytics module 120 may include a model adaptation module 130 which may be connected or coupled to external resources or sources 140 (or may be provided with data from external resources) and to an initial model 170. An external source may be, for example, documents available via the Internet, social media posts, tweets, blogs, forums messages or any other textual material. According to embodiments of the invention an external sources or external resource may include any source which is different from the audio interactions captured in the specific site.

An adapted model 171 generated by model adaptation module 130 may be used by a speech to text analyzer 150 and further by additional analysis module 160. While specific modules are shown herein, the arrangement shown is merely an example, and in other embodiments functionality of embodiments of the invention may be carried out by other arrangements of components.

Interaction analytics 120 may be or include a processor 180 which may be, for example, a central processing unit processor (CPU), a chip, one or more processors or any suitable computing or computational device. Interaction analytics 120 may include or execute in conjunction with one or more operating systems which may be or may include any code segment designed and/or configured to perform tasks involving coordination, scheduling, arbitration, supervising, controlling or otherwise managing operation of interaction analytics 120, for example, scheduling execution of programs. Interaction analytics 120 may include or be associated with a memory 190 which may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 190 may be or may include a plurality of, possibly different memory units. Memory 190 may include executable code, e.g., an application, software, a program, a process, task or script. The executable code may be executed by processor 180 possibly under control of an operating system. Memory 190 may store data operated on or created by embodiments of the present invention such as, a phonetic index of the interactions, speech to text output of the interactions and the like. Storage 119 may be or may include, for example, a hard disk drive, a floppy disk drive, a Compact Disk (CD) drive, a CD-Recordable (CD-R) drive, a universal serial bus (USB) device or other suitable removable and/or fixed storage unit.

Interaction analytics 120 may be coupled to input devices 185 and to output devices 195. Input devices 185 may be or may include a mouse, a keyboard, a touch screen or pad or any suitable input device. It will be recognized that any suitable number of input devices may be operatively connected to interaction analytics 120. Output devices 195 may include one or more displays, monitors, speakers and/or any other suitable output devices. It will be recognized that any suitable number of input devices and/or output devices may be operatively connected to any number of computing devices. Any applicable input/output (I/O) devices may be connected to interaction analytics 120. For example, a network interface card (NIC), a printer or facsimile machine, a universal serial bus (USB) device or external hard drive may be included in input devices 185 and/or output devices 195.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 190 may contain instructions which a processor such as processor 180 executes.

System 100 may comprise one or more computing platforms, executing components for carrying out the disclosed steps. The computing platform may be a general purpose computer such as a personal computer, a mainframe computer, or any other type of computing platform that is provisioned memory 190, a CPU or microprocessor or processor 180, and several I/O ports or I/O devices 185 and 195. In some embodiments, methods according to embodiments of the invention may be carried out by processor 180 or other processors executing code or software. For example, the functionality of one or more of model adaptation module 130, testing module 135, speech to text analyzer 150, analysis module 160, interaction analytics 120 and capturing module 116 may be carried out by processor 180 or other processors executing code or software. More than one processor may be used, in more than one location.

The modules and components may include one or more sets or collections of computer instructions, such as libraries, executables, modules, or the like, programmed in any programming language such as C, C++, C#, Java or others, and developed under any development environment, such as .Net, J2EE or others.

Alternatively, the apparatus and method may be implemented as firmware ported for a specific processor such as digital signal processor (DSP) or micro controllers, or may be implemented as hardware or configurable hardware such as field programmable gate array (FPGA) or application specific integrated circuit (ASIC). The software components may be executed on one platform or on multiple platforms wherein data may be transferred from one computing platform to another via a communication channel, such as the Internet, Intranet, Local area network (LAN), wide area network (WAN), or via a device such as CDROM, disk on key, portable disk or others.

Interaction analytics 120 may include an initial model 170 which may include a generic speech recognition model, for example, a Large Vocabulary Continuous Speech Recognition (LVCSR) model. A speech recognition model such as a LVCSR model may contain an acoustic model and a language model. Those two models may be obtained by training them using a generic corpus of audio interactions or generic data which is not domain specific. Interaction analytics 120 may initially use a non-specific trained acoustic model and a non-specific trained language model, also referred herein to as "initial model" 170.

Model adaptation module 130 may adapt, augment or add to, adjust, tune or alter the language model of initial model 170 such as to fit or to the specific domain of, or used with, system 100. Model adaptation module 130 may use a set of automatically transcribed interactions from the domain, e.g., received by one or more sources 110 and/or data from external resources 140 or any other textual material that exists in a specific organization, environment and the like in order to generate from model 170 an adapted speech recognition model. Model adaptation module 130 may adapt, modify or adjust the initial model 170 by applying text analytics techniques as described with reference to embodiments of the invention. Model adaptation module 130 may perform the adaptation process on or for a given site, for example, an organization, a contact center or an environment for the first time during or immediately after installation of the interaction analytics module 120 and/or capturing module 116. Model adaptation module 130 may perform the adaptation process every predefined period of time, e.g. one or more days, weeks, months, years, in order to adapt to the dynamic linguistic features, terms, idioms, of the site that may change with time.

Although embodiments of the invention are not limited in this respect, model adaptation module 130 may include a testing module 135 which may test the adapted speech model and may for example predict whether using adapted model 171 is expected to improve the Word Error Rate (WER) of the speech recognition model used in a speech to text analyzer 150, or make other determinations or measurements. If adapted model 171 is expected to improve the WER then adapted model 171 may be stored, e.g., in memory 190, and may be ready for further use by the speech to text analyzer 150. If adapted model 171 is not expected to improve the WER then adapted model 171 may not be stored and the adapting process may be performed again, e.g., a retry to adapt the language model may be performed by model adaptation module 130 by using a different set of data from external resource 140. In some embodiments, if adapted model 171 is not expected to improve the WER, model adaptation module 130 may use the initial model instead.

Speech to text analyzer 150 may use adapted model 171 in order to automatically transcribe new interactions that are captured by capturing module 116 by the adapted model generated by model adaptation module 130. The output of speech to text analyzer 150 may be sent to additional analysis component 160 which may perform additional analysis on the automatically transcribed interactions. The additional analysis may include but is not limited to topic extraction, categorization, clustering, link analysis or the like. Other analysis methods may be performed by additional analysis component 160.

Although the invention is not limited in this respect, speech to text analyzer 150 may perform, apply or use a plurality of algorithms to perform the automatic transcription. The transcription process may include segmenting of the interaction, namely, breaking up the speech into segments, followed by passing over the segments a plurality of times and converting speech to text.

Figure 2:
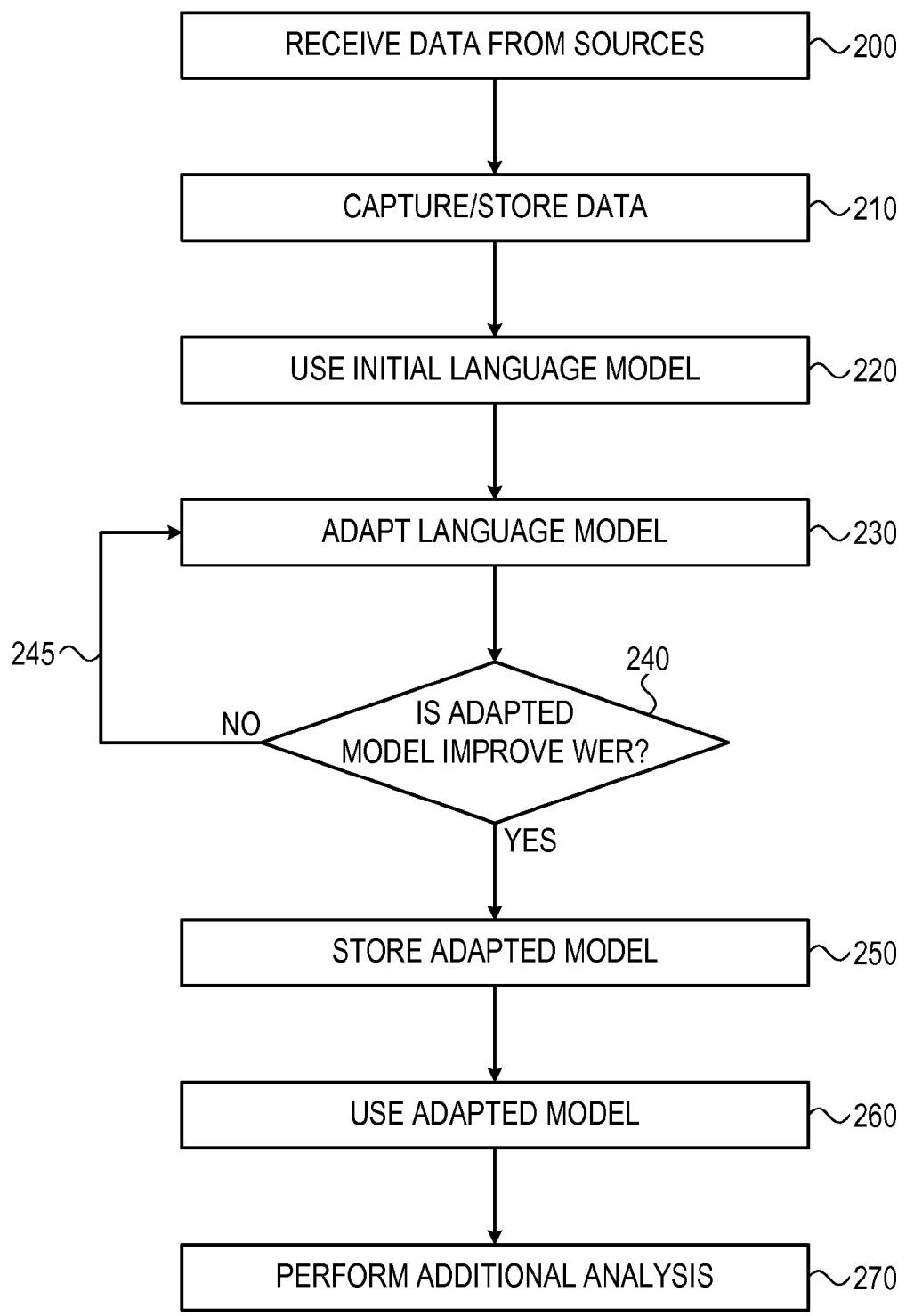
FIG. 2 is a high level flowchart of a method for adapting a language model according to embodiments of the present invention.

Reference is now made to FIG. 2 which is flowchart of a method for adapting a language model according to embodiments of the present invention. Operations of the method may be implemented, for example, by one or more of the elements in FIG. 1, for example, sources 110, capturing module 116, interaction analytics module 120 and/or by other suitable units, devices, and/or systems.

As indicated at box 200, the method may include receiving data from a plurality of sources, e.g., sources 110 of FIG. 1. The data may include various types of interactions between agents, customers, users, traders, customer representatives, employees, organization members or other parties and may have a plurality of formats, or types. For example, input data may include auditory segments, video segments, textual transcripts, documents or interactions or any other type of data. While in one embodiment operation in conjunction with a trading system (e.g., a financial trading system) is described, other embodiments may operate in conjunction with other organizations or operations.

As indicated at box 210, the method may include capturing and storing of the data received at the operation corresponding to box 200 by a storage device, e.g., storage 117 of FIG. 1. According to embodiments of the invention, the data may be stored according to any criteria, for example, according to the type of the data or according to source of the data. The storage may be located locally, namely, where the data segments are captured or in a remote location.

As indicated at box 220, the method may include using an initial language model for transcription of interactions. The initial model or basic model may be a generic speech recognition model, such as Large-Vocabulary Continuous Speech Recognition (LVCSR) model. The basic language model may contain an acoustic model and a language model.

As indicated at box 230, the method may include adapting the initial language model by a model adaptation module, e.g., module 130 of FIG. 1. The model adaption process may be performed using a set of automatically transcribed interactions which are captured in a specific domain, e.g., audio data of telephone conversations as well as data from external resources such as the Internet, social media posts e.g. tweets, blogs, forums messages or any other textual material that may relate to the specific domain. The model adaptation process, described in embodiments of the invention, may generate an adapted language model that may be used by, for example, by interaction analytics module 120 of FIG. 1. The model adaptation process may by performed every predefined period of time in order to adapt to the linguistic features, terms and/or idioms of the specific domain that may change along the course of time.

As indicated at box 240, the method may include testing the adapted language model generated in box 230. The testing process may predict whether using the adapted model is expected to improve the WER in the language model used in a specific model. If the adapted model is expected to improve the WER then the adapted model is stored, as indicated at box 250, and is ready for further use by the language model (indicated at box 260. If the adapted model is not expected to improve the WER, then the method may include retrying to adapt the language model by a different set of transcribed interaction and/or other data from external resource by iterating to or returning to box 230 as indicated by arrow 245.

As indicated at box 250, the method may include storing the adapted model if the adapted model is expected to improve the WER. The adapted model may be stored in a storage device, e.g., memory 190 of FIG. 1. The storage may be, for example, an optical storage device such as a CD, a DVD, or a laser disk; a magnetic storage device such as a tape, a hard disk, Storage Area Network (SAN), a Network Attached Storage (NAS), a semiconductor storage device such as Flash device, memory stick, or any other storage device.

As indicated at box 260, the method may include using the adapted model during transcription of interactions by a speech to text analyzer, e.g., module 150 of FIG. 1. A speech to text analyzer may use the adapted model in order to automatically transcribe interactions that are captured by capturing and logging components, for example, capturing module 116 of FIG. 1.

As indicated at box 270, the method may include performing additional analysis on the transcribed interactions, which may include but is not limited to topic extraction, categorization, clustering, link analysis and the like.

It should be understood to a person skilled in the art that other operations or sets of operations may be used in accordance with embodiments of the invention.

Figure 3:
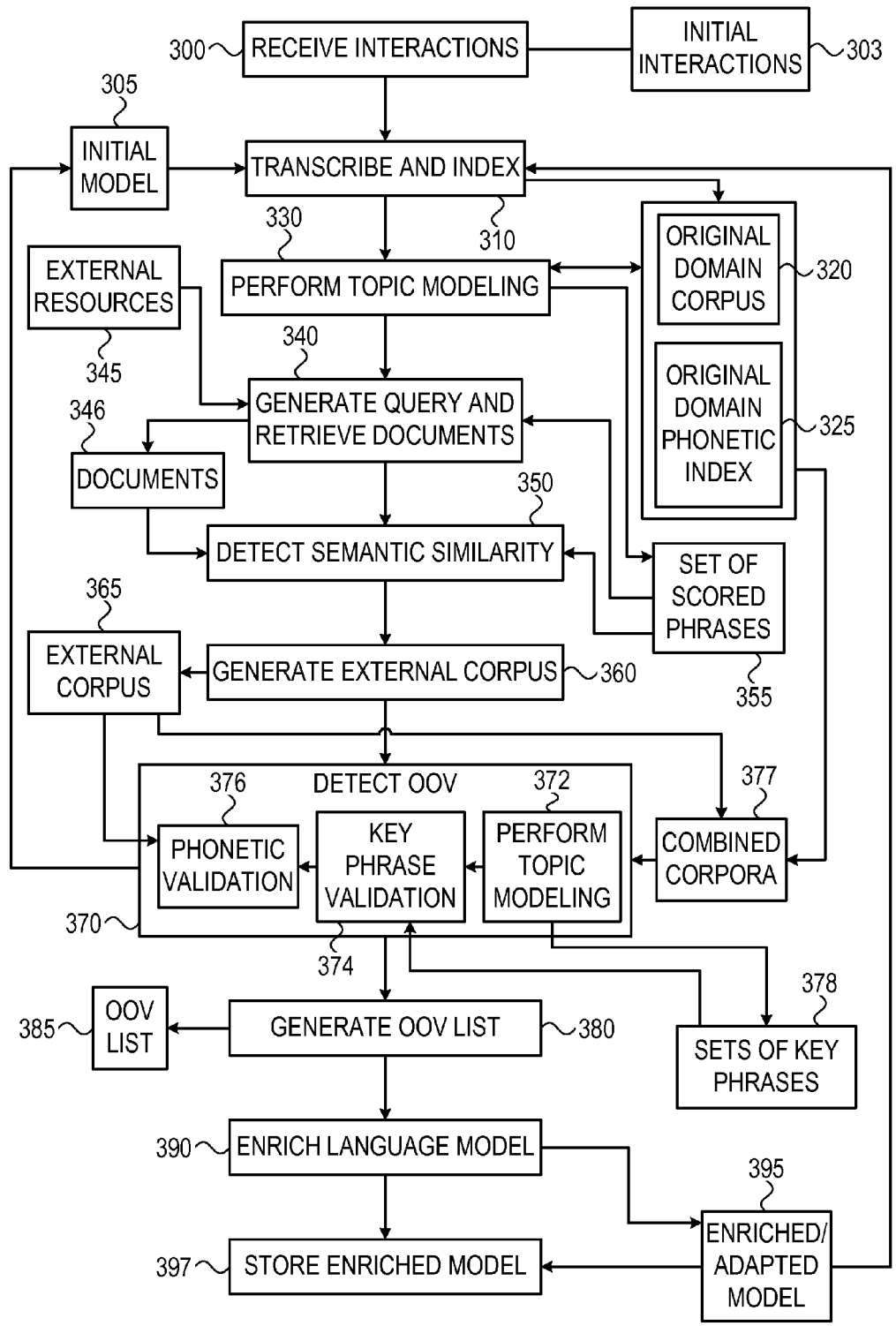
FIG. 3 is a flowchart of an automatic language model adaptation process according to embodiments of the present invention.

Referring now to FIG. 3 which is a flowchart of an automatic language model adaptation process according to embodiments of the present invention. Operations of the method may be implemented, for example, by one or more of the elements in FIG. 1 and/or by other suitable units, devices, and/or systems.

As indicated at box 300, the method may include receiving a set, group or collection of interactions that were captured in a certain contact center or other environment or organization. The interactions may be received in a certain contact center at an initial stage, e.g., at a time that immediately follows system installation. Although the invention is not limited in this respect, a typical set or collection size may be for example, hundreds of interactions of average length of a few minutes per interaction. Embodiments of the invention may use the first collection of interactions, also referred to herein as "initial interactions" indicated at box 303 received at a certain site in order to adapt a language model and produce a custom model for the site.

As indicated at box 310, the method may include automatically transcribing each interaction of initial interactions 303 into a plurality of textual transcripts by a speech to text algorithm, for example, by an LVCSR algorithm based on an initial model 305 and generating a set, group or collection of textual transcripts, also referred to herein as "original domain corpus" indicated at box 320. The method may further include phonetically indexing each of the interactions by a phonetic indexing algorithm and generating a set, group or collection of phonetic indexes related to original domain corpus 320, also referred to herein as "original domain phonetic index" indicated at box 325.

As indicated at box 330, the method may include performing topic modeling by applying a topic detection algorithm on the textual transcripts in order to detect the different topics discussed in the interactions. According to embodiments of the invention, each topic may have a set of important or key phrases associated with or related to its certain theme or subject. Each of the key phrases may be scored according to its importance and relevancy for that certain topic. The outputs of the topic modeling are a plurality of sets (a set for each topic) of scored key phrases, indicated at box 335. Each of the plurality of sets may include a list of phrases and each of the phrases may have a score.

As indicated at box 340, the method may include generating queries or query expressions that may be used for retrieving documents from external resources 345. The query may include one or more words, phrases or terms which are output of topic modeling process. The one or more words, phrases or terms of the query may be used as search terms in order to find or retrieve relevant documents in external resources. External resource 345 may include a plurality of resources for example, the Internet, social media posts, tweets, blogs, forums messages or any other textual material that either exists in the organization, for example, organization's products or/and services descriptions, or outside of the organization.

The query expressions may be built or generated according to and based on the key phrases 335 generated during topic modeling indicated at box 330. An exemplary query may include a predetermined number of important or key phrases that may have the highest relevancy score in a certain set of key phrases. A query may use a logical operator between each of the key phrases, for example, an 'or' operator. Queries or query expressions may be created or generated by applying a topic detection algorithm on textual transcripts as indicated at box 330 in order to detect the different topics discussed in the plurality of interactions.

According to embodiments of the invention, the query generated may be provided or fed to an automatic search engine, which may retrieve documents indicated at box 346 from external resources 345 and may rank them according to their relevancy to the query.

As indicated at box 350, the method may include detecting a contextual similarity between the documents 346 retrieved at the operation corresponding to box 340 and the set or collection of initial interactions 303 received at the operation corresponding to box 300. In general, semantic similarity may measure the extent to which a document is similar to another document, a set of documents or a set of phrases. Each of the documents retrieved at the operation corresponding to box 340 may be ranked or scored according to the semantic similarity to the set of key phrases 335 that may constitute the topics that extracted at the operation corresponding to box 330. key phrases are extracted from each document of document 346 and may be scored.

Semantic similarity may be measured by a predetermined similarity formula, may produce a score based on the differences between the set of key phrases 335 and the key phrases extracted from every retrieved document 346. The following similarity function [1] is an exemplary function, other formulas may be used:

$$Sim(Doc_i) = \left\| \frac{V_i * V_{topics}}{\|V_i\| * \|V_{topics}\|} \right\|$$

Wherein i may represent a document, e.g., one of the one or more documents retrieved at box 340. Vi may represent the frequency list of important or key phrases extracted from the text of the i-th document along with their respective frequencies and Vtopics may represent the list of key phrases representing the topics extracted at box 330 by the topic detection algorithm.

Figure 4:
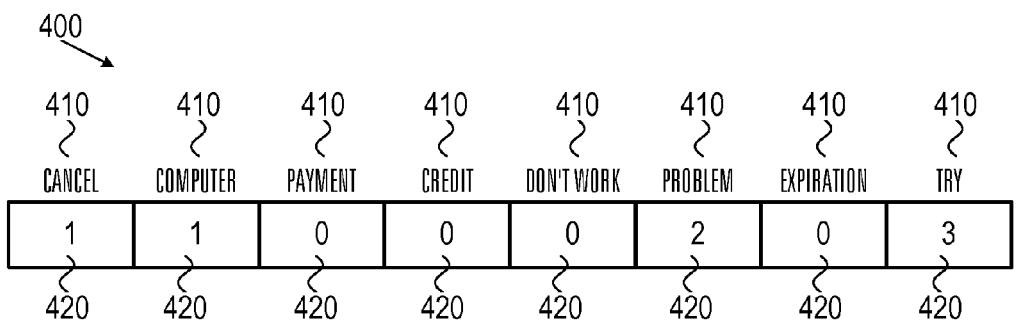
FIG. 4 is an illustration of a frequency list according to embodiments of the invention

Reference is made now to FIG. 4 which is an illustration of a frequency list according to embodiments of the invention. List 400 may be generated at box 330 by a topic modeling algorithm and at box 340 where key phrases frequency list may be extracted from every document 346 retrieved from an external resource. List 400 may include a plurality of phrases 410 and the score 420 of each of the plurality of phrases as detected, identified or found in a certain document.

Reference is made back to FIG. 3; as indicated at box 360, the method may include generating an external corpus 365 by selecting a plurality of documents from documents 346 retrieved at box 340. The method may include selecting the documents which are most relevant, pertinent or related to the specific domain. The selection may be based on the similarity scores produced by operation corresponding to box 350. The relevant documents are those that may exhibit a sufficiently strong semantic similarity to the transcribed interactions received at box 300. Documents that achieved a similarity score, calculated at box 350, that may be above a predefined threshold may be added to an external corpus 365.

As indicated at box 370, the method may include identifying, detecting or finding OOV words or terms, e.g., words or phrases that may be relevant to or associated with the domain or related to or associated with the environment but which are not included in the original or initial vocabulary or language model, e.g. the vocabulary of initial model 305. By detecting or finding such words and phrases the method may be used to expand the initial language model 305. The method may include indentifying or detecting relevant words, phrases and terms. The OOV detection step indicated at box 370 may include topic modeling step indicated at box 372, an important or key phrase validation step indicated at box 374 and a phonetic validation step indicated at box 376.

As indicated at box 372, the method may include performing topic modeling on a combined corpora 377. Combined corpora 377 may be created by combining external corpus 365, generated at box 360, and the domain interactions corpus 320, generated at box 310. The topic modeling may include extraction of topics from combined corpora 377. The topic extraction operation may be analogous to the topic modeling process indicated at box 330. According to embodiments of the invention, the output of the topic modeling process may include a key phrases list 378. List 378 may include a plurality of sets, each may contain a plurality of key phrases. Each of the sets may be related to a topic or subject extracted from combined corpora 377 (e.g., a number or collection of corpus entities). Each of the key phrases may be scored or rated for example according to its importance and relevance for a certain topic.

As indicated at box 374, the method may include validating of key phrases. The sets of scored key phrases 378 generated at box 372 may be qualified or disqualified from entering into an OOV list 385, generated at box 380.

Figure 5:
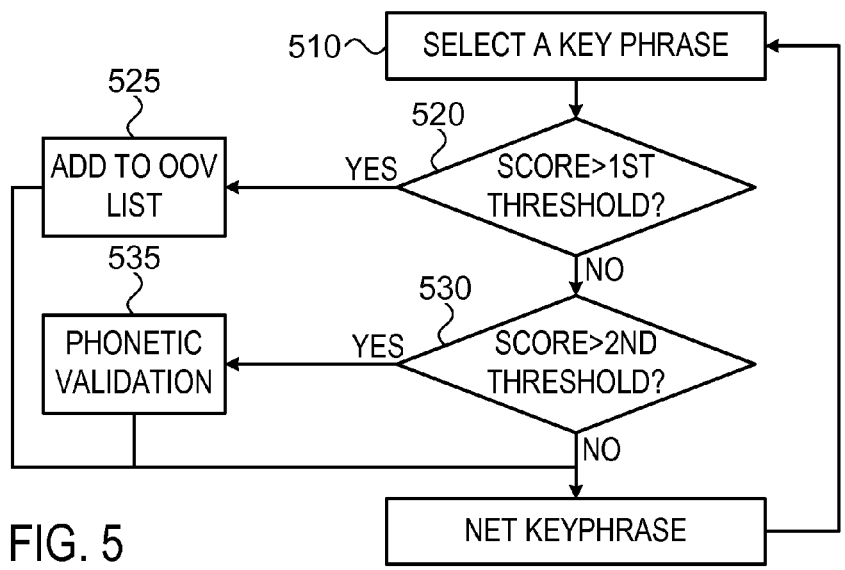
FIG. 5 is a flowchart of a validation process according to embodiments of the invention.

Reference is made now to FIG. 5 which is a flowchart of a validation process according to embodiments of the invention. Flowchart 500 may illustrate the steps indicated at boxes 374, 376 and 380 of FIG. 3. According to embodiments of the invention, in order to find terms, words or phrases which may be important to a certain domain, the score of each of key phrases of list 378 may be checked. As indicated at box 510, a key phrase from list 378 may be selected and the score of that key phrase may be checked as indicated at box 520. If the score of the key phrase is higher than a first predefined threshold, the key phrase may be added to OOV list 385 of FIG. 3, as indicated at box 525. If the score of the key phrase is lower than the first predefined threshold but higher than a second predefined threshold as indicated at box 530, the key phrase may be transferred to a phonetic validation process indicated at box 535 and further described at box 376 of FIG. 3. If the score of the key phrase is lower than the second predefined threshold, the key phrase is not added to the domain vocabulary and next key phrase may be checked, by returning to box 510, allowing for iteration through the process. Although embodiments of the invention are not limited in this respect, a key phrase which may be found as applicable for being added to OOV list 385 may not be part of original domain corpus 325.

Reference is made back to FIG. 3; as indicated at box 376, during a phonetic validation process a list words may be extracted from the external corpus 365. Words extracted from external corpus 365 which may not appear in initial model 305 may be extracted, thus creating a candidate OOV list. Each word in candidate OOV list may be converted to a sequence of phonemes forming a phonetic representation of the word. Each of the resulting sequence of phonemes may be searched against original domain phonetic index 325 (the phonetic representation of the interaction received at box 300) and a list of locations and a phonetic certainty scores may be produced. The locations may be the locations of the words in the domain interaction corpus 320. Each phonetic certainty score or rating may reflect the similarity between the phonetic representation of the word and the word that is uttered by the speaker in the relevant location. The certainty score may reflect the level of certainty that a searched word may indeed be found in this location. The phonetic certainty score may be in a predefined range of phonetic similarity score, for example, a range defined between 0-100. If the phonetic similarity score is higher than a predefined phonetic threshold, e.g. 80, than the word along with its phonetic representation may added to the OOV list 385.

According to embodiments of the invention, key or important phrases that are output from key phrases validating step (indicated at box 374) may undergo the same flow or process as the candidate OOV list words but their certainty may be compared against a lower phonetic threshold, e.g. 50. In case that the certainty is higher than the lower phonetic threshold than the word along with its phonetic representation may be added to the OOV list 385. The phonetic representations may represent variations in pronunciations and may thus be added to the language model as additional options to pronounce the terms so that to improve the robustness of the speech recognition model not only at the level of words but also at the level of phonemes.

As indicated at box 380, the method may include generating OOV list 385. OOV list 385 may include words, terms or phrases that may be generated by the topic modeling as indicated at box 372 and may pass the key phrase validation process, indicated at box 374 and the phonetic validation, indicated at box 376. In addition, generating OOV list 385 may include words, terms or phrases from words that were extracted from external corpus 365 and pass the phonetic validation step 376 using a higher threshold.

As indicated at box 390, the method may include enriching, modifying or adapting the language model by modifying the initial model 305 such that the language model's lexicon may be enriched and/or the word n-grams probabilities may be updated. The enrichment or adaptation process may include adding new entries or words to initial language model 305 and generating enriched or adapted language model 395. For example, terms detected in operation 370 may be added to the language model. Enriched or adapted language model 395 may list or include all words recognized by the language model along with their corresponding phoneme sequences. In addition an enrichment process may include modifying the probabilities of sequences of up to n words, also known as the "n-grams" to allow the probabilities of enriched language model 395 to be obtained by computing a weighted sum of those of the original initial language model 305 and words of the language model induced by the new additions. The weights may be calculated in an optimization process based on a target corpus designed to represent a specific domain for testing purposes. The target corpus may be built from, for example, call transcriptions, external resources as used in the process, and, documents within the organization.

Enriched language model 395 may be stored as indicated at box 397 and may be ready for the analysis of interactions at box 310.

It should be understood to a person skilled in the art that other operations or sets of operations may be used in accordance with embodiments of the invention.

Figure 6:
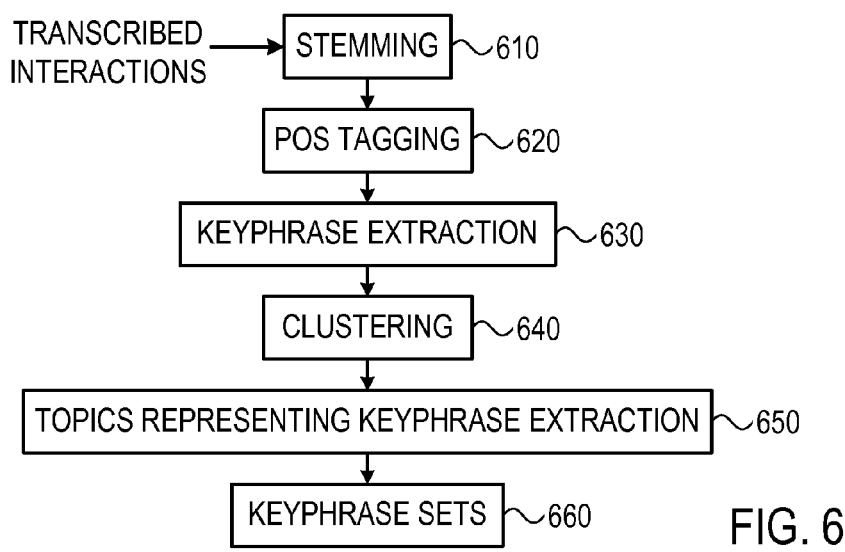
FIG. 6 is a flowchart of a topic modeling process according to embodiment of the invention.

Reference is made to FIG. 6, which is a flowchart of a topic modeling process according to embodiment of the invention. FIG. 6 may represent the topic modeling process indicated at box 330, and at box 372 of FIG. 3. One embodiment of operations described at FIG. 6 is described in the U.S. patent application Ser. No. 13/026,314, filed on Feb. 14, 2012 which is included herein by reference.

As indicated at box 610, a transcribed interaction may undergo stemming, namely, reducing inflected or derived words to their stem, base or root form, generally a written word form, for example, detecting the base form of each word, typically a singular and present form.

As indicated at box 620, the transcribed interaction may undergo Part Of Speech (POS) tagging. The POS tagging may be performed based on the definition as well as on the context of words detected in the interaction, and may serve for reducing ambiguity of words within the context. The tags may include a verb, a noun (singular), a noun (plural), a pronoun, a preposition, an adverb, an adjective, and the like.

It should be understood to a person skilled in the art that the steps and operations indicated at boxes 610 ands 620 may be performed using proprietary tools, or any other external or commercial tools, such as LinguistxPlatform™ manufactured by Inxight (www.inxight.com).

As indicated at box 630, key phrases may be extracted from the tagged texts generated at box 620, e.g., from each of the transcribed and tagged interactions. Key phrases may be extracted using linguistic rules as described in the U.S. Patent application 2009/0292541 included herein by reference. In addition, other features may be extracted from the transcribed and tagged interactions. The feature may include a list of key phrase appearances in the interaction, referred to herein as "key phrase frequencies" and may also contain word frequency, or other numerical statistic which reflect how important a word is to a document in a collection or corpus.

As indicated at box 640, document level clustering may be performed. The document level clustering process may include clustering interactions into clusters. Each of the clusters may represent the different topics uttered in the domain. The clustering method is preferably but not limited to K-means clustering. Other clustering methods or clustering analyses such as hierarchical clustering may be used.

As indicated at box 650, the key phrases that may represent each cluster may be extracted. The key phrases are preferably extracted using Z-score method. The key phrases may also be extracted by TF-IDF or other method.

The outputs of the topic modeling process are a plurality of lists of scored key phrases, indicated at box 660. Each list may include key phrases that may represent a different cluster. Each key phrase may have a score that may reflect the level of its representation of the cluster/topic. For example, sets of scored key phrases 335 of FIG. 3 may be the output of a topic modeling process.

It should be understood to a person skilled in the art that other operations or sets of operations may be used in accordance with embodiments of the invention.

Figure 7:
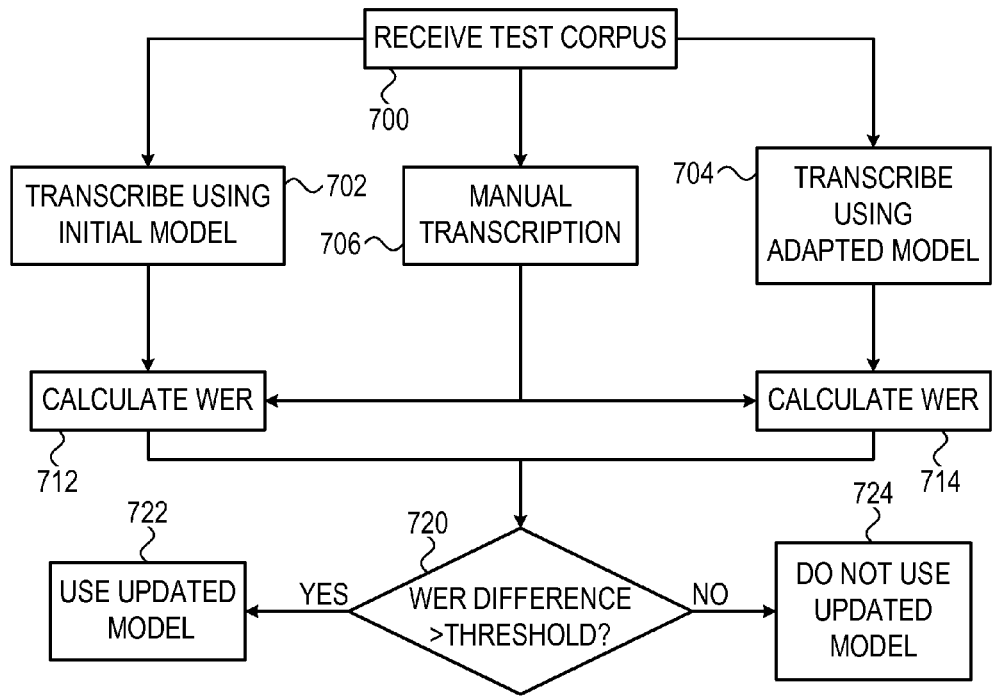
FIG. 7 is a flowchart of a testing method of an adapted language model according to embodiments of the invention.

Referring now to FIG. 7, which is a flowchart of a testing method of an adapted language model according to embodiments of the invention. FIG. 7 may represent the test process indicated at box 240 of FIG. 2.

As indicated at box 700, the method may include a receiving test corpus assembled of interactions, e.g., audio interactions, captured on a specific site or environment. It should be understood that test corpus 700 may be different from the collection of interactions received at box 300 of FIG. 3 (initial interaction 303) which may be used for adapting initial model 305. The test corpus 700 may be another set of interactions captured at the same site in which initial interaction set 303 was created. The collection size may vary and may include, foe example, hundreds interactions of average length of, for example, minutes per interaction.

As indicated at box 702, each interaction from test corpus 700 may be transcribed by a speech recognition model, for example an LVCSR model using an initial model, e.g., initial model 305 of FIG. 3. The output of this phase may be a collection of textual transcripts, referred to herein as "a first test corpus".

As indicated at box 704, each interaction from test corpus 700 may be transcribed by a speech recognition model, for example an LVCSR model using the enriched language model 395 that may be generated at box 390 of FIG. 3. The output of this phase may be a collection of textual transcripts, referred to herein as "a second test corpus".

As indicated at box 706, each interaction from test corpus 700 may manually transcribed by a human transcriber. The output of this phase may be a collection of textual transcripts, referred to herein as "a reference test corpus."

As indicated at box 712, the WER of the first test corpus may be calculated relative to the reference test corpus.

As indicated at box 714, the WER of the second test corpus may be calculated relative to the reference test corpus.

As indicated at box 720, the WER difference may be calculated by subtracting the WER calculated at boxes 712 and 714. If the WER difference is higher than a predefined threshold, for example, 5% of the WER, enriched model 395 may be pass the test and may be stored and used as the transcription language model in the transcription of a next interaction, as indicated at box 722. If the WER difference is lower than the predefined threshold, the enriched model 395 may not be stored and may not be used transcription of a next interaction, as indicated at box 724. According to embodiments of the invention, if the WER difference is lower than the predefined threshold the method may include retrying to adapt the model using a different set of data from external resources, e.g., external resources 345 of FIG. 3, alternatively the system may use initial model 305, of FIG. 3.

It should be understood to a person skilled in the art that other operations or sets of operations may be used in accordance with embodiments of the invention.

Figure 8:
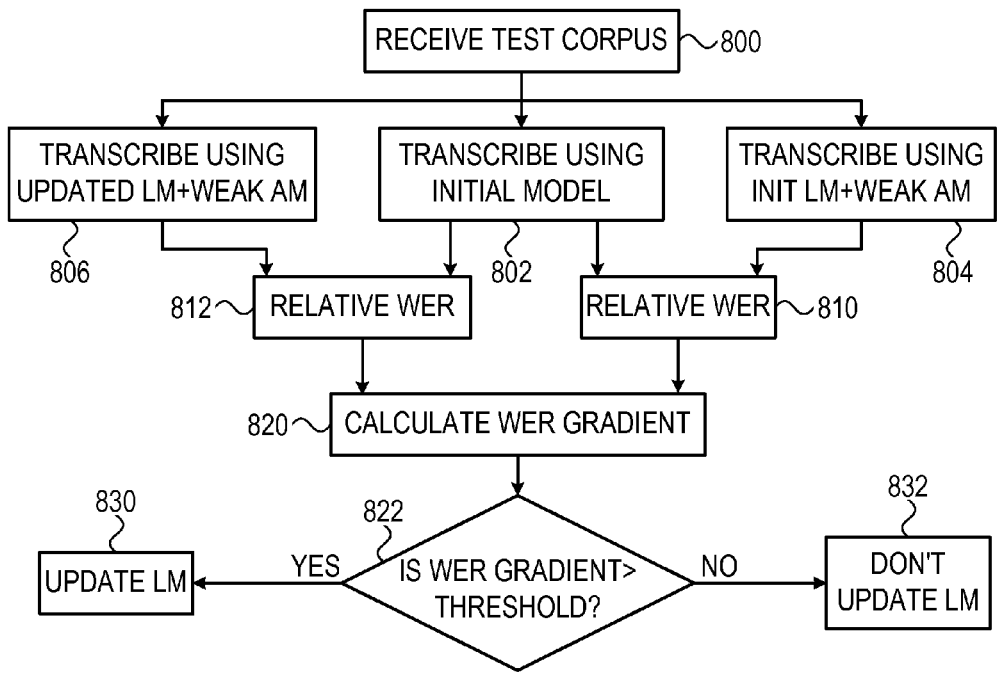
FIG. 8 is a flowchart of a testing method of an adapted language model according to embodiments of the invention.

Referring now to FIG. 8, which is a flowchart of another testing method of an adapted language model according to embodiments of the invention. FIG. 8 may represent the test process indicated at box 240 of FIG. 2.

As indicated at box 800, the method may include a receiving test corpus assembled of interactions, e.g., audio interactions, captured on a specific site or environment. It should be understood that test corpus 800 may be different from the collection of interactions received at box 300 of FIG. 3 (initial interaction 303) which may be used for adapting initial model 305. The test corpus 800 may be another set of interaction captured at the same site in which initial interaction set 303 was created. The collection size may vary and may include, foe example, hundreds interactions of average length of, for example, minutes per interaction.

As indicated at box 802, each interaction from test corpus 800 may be transcribed by a speech recognition model, for example an LVCSR model using an initial language model, e.g., initial model 305 of FIG. 3. The output of this phase may be a collection of textual transcripts, referred to herein as "a reference test corpus".

As indicated at box 804, each interaction from test corpus 800 may be transcribed by a speech recognition model, for example an LVCSR model using the initial language model e.g., initial model 305 of FIG. 3 and an acoustic model. The acoustic model may be "weaker" than the acoustic model of the initial mode. For example, the acoustic model may be trained in the same way that the initial model acoustic model may be trained but with a reduced number of phonetic states. For example if the acoustic model of the initial model may be trained using a trigram phoneme model the weaker acoustic model may be trained using a bigram or unigram phoneme model. The output of this phase may be a collection of textual transcripts, referred to herein as "a first test corpus".

As indicated at box 806, each interaction from test corpus 800 may be transcribed by a speech recognition model, for example an LVCSR model using the enriched language model 395 that may be generated at box 390 of FIG. 3 and an acoustic model identical to the "weaker" acoustic model used at box 804. The output of this phase may be a collection of textual transcripts, referred to herein as "a second test corpus".

As indicated at box 810, the WER of the first test corpus may be calculated relative to the reference test corpus.

As indicated at box 812, the WER of the second test corpus may be calculated relative to the reference test corpus.

As indicated at box 820, the WER difference may be calculated by subtracting the WER calculated at boxes 810 and 812.

As indicated at box 822, if the WER difference is higher than a predefined threshold, for example, 5% of the WER, enriched model 395 may be pass the test and may be stored and used as the transcription language model in the transcription of a next interaction, as indicated at box 830. If the WER difference is lower than the predefined threshold, the enriched model 395 may not be stored and may not be used transcription of a next interaction, as indicated at box 832. According to embodiments of the invention, if the WER difference is lower than the predefined threshold the method may include retrying to adapt the model using a different set of data from external resources, e.g., external resources 345 of FIG. 3, alternatively the system may use initial model 305, of FIG. 3.

It should be understood to a person skilled in the art that other operations or sets of operations may be used in accordance with embodiments of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for adapting a language model to a specific environment, the method comprising:

receiving, by a processor, a plurality of interactions captured in the specific environment;

retrieving, by the processor, a plurality of external documents based on a plurality of query expressions, wherein query expressions are generated by applying a topic detection algorithm on textual transcripts in order to detect the different topics discussed in the plurality of interactions;

generating, by the processor, an external corpus by selecting documents from the documents retrieved;

detecting in the external corpus terms related to the environment that are not included in an initial language model; and adapting, by the processor, the initial language model to include a plurality of the terms detected.

2. The method of claim 1, comprising automatically transcribing each of the plurality of the interactions into a textual transcript based on the initial language model.

3. The method of claim 1, wherein generating the external corpus comprises selecting a plurality of documents from the documents retrieved based on semantic similarity between the documents retrieved and the plurality of interactions.

4. The method of claim 1, wherein detecting terms related to the environment comprises performing topic modeling on a corpora comprising the external corpus.

5. The method of claim 4, wherein detecting terms related to the environment comprises performing validation of key phrases from the corpora.

6. The method of claim 5, wherein detecting terms related to the environment comprises performing phonetic validation of the key phrases from the corpora.

7. The method of claim 5, wherein adapting the initial language model comprises modifying the initial language model such that a speech recognition model is to recognize the terms detected.

8. The method of claim 1, comprising:

testing the adapted language model; and storing the adapted model if the adapted model is expected to improve the word error rate; and performing the adapting operation again if the adapted model is not expected to improve the word error rate of the initial language model.

9. A system for adapting a language model to a specific environment, the system comprising:

a memory;

a recorder to capture a plurality of interactions in the specific environment; and a computer:

to retrieve a plurality of external documents based on a plurality of query expressions, wherein query expressions are generated by applying a topic detection algorithm on textual transcripts in order to detect the different topics discussed in the plurality of interactions, to generate an external corpus by selecting a plurality of documents from the documents retrieved, to detect in the external corpus terms related to the environment that are not included in an initial language model, and to adapt the initial language model to include a plurality of the terms detected.

10. The system of claim 9, wherein the computer is to automatically transcribe each of the plurality of the interactions into a plurality of textual transcripts based on the initial language model.

11. The system of claim 9, wherein the computer is to generate the external corpus by selecting a plurality of documents from the documents retrieved based on semantic similarity between the documents retrieved and the plurality of interactions.

12. The system of claim 9, wherein the computer is to detect the terms related to the environment by performing topic modeling on a corpora comprising the external corpus.

13. The method of claim 12, wherein the computer is to detect the terms related to the environment by performing validation of key phrases from the corpora.

14. The system of claim 13, wherein the computer is to detect the terms related to the environment comprises performing phonetic validation of the key phrases from the corpora.

15. The system of claim 13, wherein the computer is to modify the initial language model such that a speech recognition model is to recognize the terms detected.

16. A method for adapting a language model, the method comprising:

retrieving, by a processor, a plurality of documents based on a plurality of query expressions, wherein query expressions are generated by applying a topic detection algorithm on textual transcripts in order to detect the different topics discussed in a plurality of interactions;
identifying, based on the plurality of documents, terms associated with an environment, wherein the identified terms are not included in a language model; and
augmenting the language model to the identified terms detected.

17. The method of claim 16, wherein the plurality of documents are retrieved from external resources.

18. The method of claim 16, further comprising:
receiving a plurality of interactions captured in the environment; and
automatically transcribing each of the plurality of the interactions into a plurality of textual transcripts based on the language model.

* * * * *